US006912179B1

(12) United States Patent
Duke

(10) Patent No.: US 6,912,179 B1
(45) Date of Patent: Jun. 28, 2005

(54) CUE DELAY CIRCUIT

(75) Inventor: Ronald J. Duke, Centerville, OH (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/942,440

(22) Filed: Sep. 15, 2004

(51) Int. Cl.[7] ........................ G04B 47/00; G04F 10/00; B41J 29/38; G06F 16/00

(52) U.S. Cl. ............................ 368/10; 368/108; 347/5; 347/20; 358/1.15; 358/1.16

(58) Field of Search ................................ 368/107–109; 347/5, 20; 355/18, 1.15, 1.16

(56) References Cited

U.S. PATENT DOCUMENTS 4,045,136 A * 8/1977 Watson et al. ................ 355/83
4,860,219 A * 8/1989 Schulz et al. .............. 358/1.17
5,557,304 A * 9/1996 Stortz .......................... 347/15
6,109,732 A * 8/2000 Wen ............................ 347/57
6,559,962 B1 * 5/2003 Fukunaga et al. ......... 358/1.15
6,803,989 B2 * 10/2004 Silverbrook ................. 355/18

* cited by examiner

*Primary Examiner*—Vit W. Miska
(74) *Attorney, Agent, or Firm*—The Buskop Law Group, P.C.

(57) ABSTRACT

A cue delay circuit for an ink jet printing system includes a state machine with sequenced logic circuits that generate buffered control signals; a counter that counts one of the buffered control signals to form a read address; and an adder that combines the read address to the cue delay value to generate a write address. A comparator compares the cue delay value to the read address to determine if the read address is greater than the cue delay value. A multiplexer receives the read and write address and one of the buffered control signals and forms a multiplexer output. The system includes a gate circuit that receives the latched comparator output and the RAM output signal forming a gated cue signal; and a logic circuit that sends a signal to the printing system.

9 Claims, 2 Drawing Sheets

CUE DELAY CIRCUIT

FIELD OF THE INVENTION

The present embodiments relates to a cue delay circuit for an ink jet printing system.

BACKGROUND OF THE INVENTION

The ink jet printing industry has need for properly positioning data and printing information on print media. To accommodate the need for time to process the new data for proper insertion on the paper, the need for cue delays has arisen. Also, there is a need to control various peripheral devices simultaneously with printing and a cue delay has been become an easy fix to enable smooth incorporation of these devices with the printer.

So far, the cue delay systems have been cumbersome, slow, and inaccurate.

A need exists for a fast, instantaneous system which provides smooth, efficient operation of the printer while incorporating new information.

The need for such cue delay circuits is compounded on printing systems that employ a plurality of print heads which print on the print media sequentially. It is important to have separate cue delay signals so that each of the print heads can output properly when registered with an adjacent printhead.

Traditionally, the cues are highly programmed and it has been impossible to have a standard cue delay as each print job is different. Accordingly, the present invention provides the flexibility needed to provide a cue delay for different size jobs, different combinations of print heads, and for different types of print media.

The present embodiments described herein were designed to meet these needs.

SUMMARY OF THE INVENTION

A cue delay circuit for an ink jet printing system includes a state machine containing sequenced logic circuits that receive a start pulse for initializing the state machine. The state machine receives a tachometer input and generates buffered control signals. The state machine also contains a counter with sequenced logic circuits to count one of the buffered control signals from the state machine forming a read address. An adder receives the read address and a cue delay value and adds the read address to the cue delay value generating a write address.

The systems include a comparator that compares the cue delay value to the read address to determine if the read address is greater than the cue delay value and forms a comparator output. A multiplexer (MUX) receives the read address, the write address, and one of the buffered control signals. The MUX, the read address, or the write address forms a multiplexer output. A read-access memory (RAM) receives the multiplexer output, which serves as an address for the RAM. A cue signal and one of the buffered control signals serves as a read/write control for the RAM to provide a RAM output signal. At least one flip flop latches to the comparator output forming a latched comparator output. A gate circuit receives the latched comparator output and the RAM output signal forming a gated cue signal. A logic circuit receives one of the buffered control signals and the gated cue signal to output a delayed cue signal to the printing system.

BRIEF DESCRIPTION OF THE DRAWINGS

In the detailed description of the preferred embodiments presented below, reference is made to the accompanying drawings, in which.

The present embodiments are detailed below with reference to the listed Figures.

DETAILED DESCRIPTION OF THE INVENTION

Before explaining the present embodiments in detail, it is to be understood that the embodiments are not limited to the particular descriptions and that it can be practiced or carried out in various ways.

A key benefit of the present integrated circuits and methods is that the need to write out all prior RAM cue locations in the memory of an ink jet printhead to zero is eliminated, thereby saving significant amounts of time and additional logic circuits. The instant cue delay incorporated in the embodiments herein enable printers to restart immediately after stopping by not having to zero out the RAM. The printer simply starts with a new delay value that is more efficient than those systems known in the prior art.

Safety is improved using the embodied integrated circuits since all cues are proper and accounted, particularly for page correlation systems. Reliability for compiling a multicolor document printed by a number of printheads is increased using the embodied integrated circuits because the printheads do not have to be properly aligned off the same document.

Figure 1:
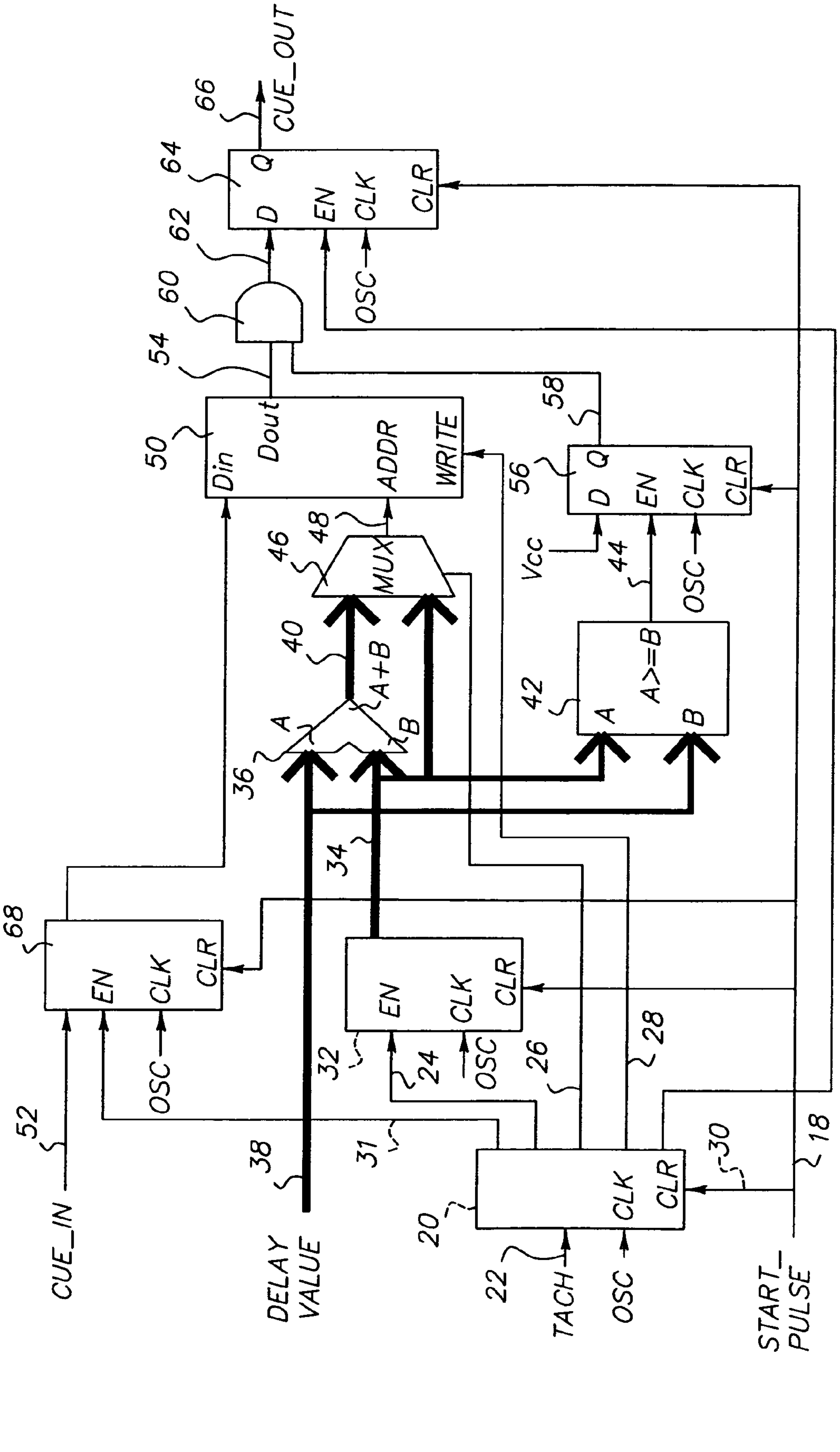
FIG. 1 is block diagram of the invention.

With reference to the figures, FIG. 1 depicts an integrated circuit for an ink jet printer. The embodied integrated circuit contains a state machine 20 with numerous sequenced logic circuits adapted to receive a start pulse 18. The start pulse 18 initializes the state machine 20. The state machine 20 receives a tachometer input 22 and generates numerous buffered control signals 24, 26, 28, and 30 from the tachometer input 22.

The integrated circuit includes a counter 32 with numerous sequenced logic circuits to count one of the buffered control signals 24 from the state machine 20 before forming a read address 34.

Continuing with FIG. 1, an adder 36 receives the read address 34 and the cue delay value 38. The adder 36 adds the read address 34 to the cue delay value 38 and generates a write address 40.

A comparator 42 compares the cue delay value 38 to the read address 34. If the read address 34 is greater than the cue delay value 38, the comparator 42 forms a comparator output 44.

A multiplexer (MUX) 46 receives the read address 34, the write address 40, and one of the buffered control signals 26 and, then, forms a multiplexer output 48 based upon the inputs. A read-access memory (RAM) 50 receives the multiplexer output 48. The multiplexer output 48 serves as a RAM address. The cue signal 52 and one of the buffered control signals 28 serves as a write/read control for the RAM to provide a RAM output signal 54.

The embodied integrated circuits include one or more flip flops 56 that latch to the comparator output 58 output forming a latched comparator output 64. An example of a flip flop 56 is a synchronous D flip flop with a chip enabler and a reset.

In an alternative embodiment, the embodied integrated circuits can include a cue pulse conditioning circuit 68. The cue pulse conditioning circuit 68 modifies the cue signal 52 by latching the cue signal 52 and synchronizing the transmission of the cue signal 52 with a buffered control signal. The cue pulse conditioning circuit 68 can further include numerous gates and flip flops.

Returning to FIG. 1, the embodied integrated circuit includes a gate circuit 60 and a logic circuit 64. The gate circuit 60 receives the latched comparator output 58 and the RAM output signal 54. The gate circuit 60 uses the inputs to form a gated cue signal 62. The logic circuit 64 receives one of the buffered control signals 30 and the gated cue signal 62. The logic circuit 64 outputs a delayed cue signal 66 to the printing system.

In an alternative embodiment, the embodied integrated circuits can include an oscillator 74 in communication the state machine 20, the counter 32, one or more flip flops 56, and the logic circuit 64.

Figure 2:
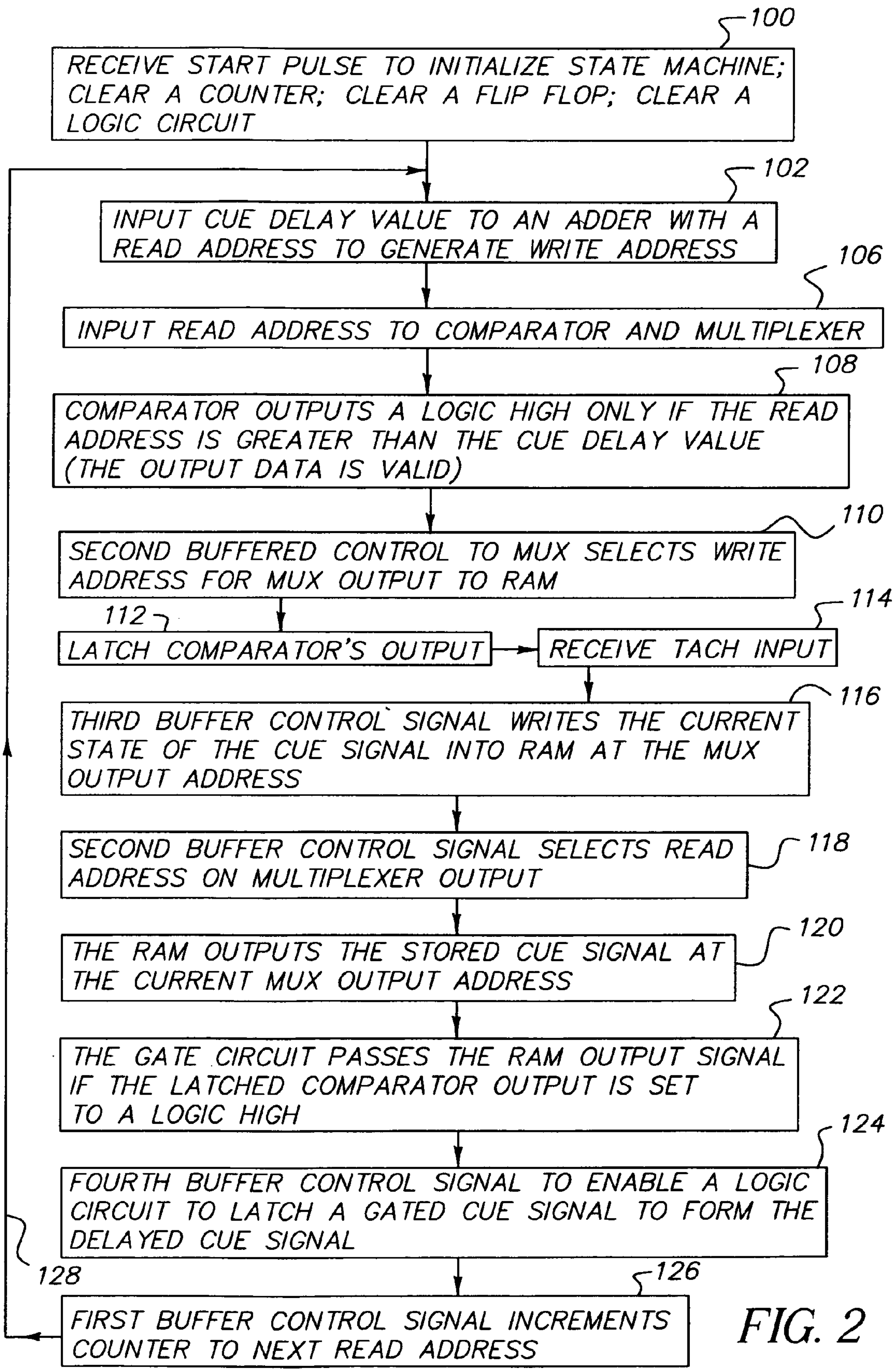
FIG. 2 is a flow diagram of a preferred method for use of the cue delay circuit.

FIG. 2 depicts a schematic for a method of using the embodied integrated circuit in an ink jet printing system. The method begins by sending a start pulse to initialize a state machine (Step 100). The initializing step entails clearing the counter, a flip flop, and a logic circuit. The counter is cleared and a read address is set to zero. The flip flop is cleared to set a latch comparator output to zero. The logic circuit is cleared to set the delayed cue signal to zero. Concurrently, a cue delay value and the read address from the counter is input to an adder that generates a write address (Step 102). The write address is supplied to a multiplexer along with the read address from the counter.

The methods continue by inputting a first buffered control signal from the state machine to a counter to increment a read address by one (Step 104) and, then, the read address is input into the comparator and a multiplexer (Step 106). While inputting the cue delay value to the adder, the cue delay value is input to a comparator to set the comparator output to a logic high value if the read address is greater than the cue delay value (Step 108).

A second buffered control signal from the state machine causes the multiplexer to provide the write address to a RAM. The second buffered control signal also provides a multiplexer output that is equal the value of the write address (Step 110). The comparator output is latched using a gate circuit (Step 112) and a tachometer input is input into the state machine (Step 114).

The next steps in the methods than inputs a cue signal to a RAM and inputs a third buffered control signal from the state machine to the RAM (Step 116). The third buffered control signal causes the current state of the cue signal to be written to the address of the RAM and to correspond to the write address received from the multiplexer. The second buffered control signal from the state machine works in conjunction with the third buffered control signal to cause the output of the multiplexer to equal the value of the read address (Step 118).

The RAM output is sent to the gate circuit (Step 120) and the gated cue signal is passed to a logic circuit if the latched comparator output is set to logic high (Step 122). A fourth buffered control signal from the state machine enables the logic circuit to latch the gated cue signal to form the delayed cue signal (Step 124). The delayed cue signal is then transmitted to the ink jet printing system (Step 126).

The steps following the initializing step are repeated until a new start pulse is received by the state machine (Step 128).

In an alternative embodiment, the methods include a step of pulsing one or more buffered control signals.

In still another embodiment, the methods can optionally include the step of employing a cue pulse conditioner to latch the cue signal until the cue signal can be written to the RAM. If a cue pulse conditioner is used, a start pulse can be used to initialize a cue pulse conditioning circuit.

The embodiments have been described in detail with particular reference to certain preferred embodiments thereof, but it will be understood that variations and modifications can be effected within the scope of the embodiments, especially to those skilled in the art.

PARTS LIST

18 start pulse
20 state machine
22 tachometer input
24 first buffered control signal
26 second buffered control signal
28 third buffered control signal
30 fourth buffered control signal
31 fifth buffered control signal
32 counter
34 read address
36 adder
38 cue delay value
40 write address
42 comparator
44 comparator output
46 multiplexer (MUX)
48 multiplexer output
50 read access memory (RAM)
52 cue signal
54 RAM output signal
56 plurality of flip flops
58 latched comparator output
60 gate circuit
62 gated cue signal
64 logic circuit
66 delayed cue signal
68 cue pulse conditioning circuit

What is claimed is:

1. A cue delay circuit for an ink jet printing system, wherein the cue delay circuit comprises:

a. a state machine comprising a plurality of sequenced logic circuits adapted to receive a start pulse for initializing the state machine, and wherein the state machine receives a tachometer input and generates a plurality of buffered control signals;

b. a counter comprising a plurality of sequenced logic circuits to count one of the buffered control signals from the state machine forming a read address;

c. an adder adapted to receive the read address and a cue delay value, wherein the adder adds the read address to the cue delay value and generates a write address;

d. a comparator adapted to compare the cue delay value to the read address to determine if the read address is greater than the cue delay value, wherein the comparator forms a comparator output;

e. a multiplexer (MUX) adapted to receive the read address, the write address, and one of the buffered control signals and forms a multiplexer output;

f. a read-access memory (RAM) adapted to receive the multiplexer output, wherein the multiplexer output serves as an address for the RAM and provides a RAM output signal;

g. at least one flip flop adapted to latch to the comparator output forming a latched comparator output;

h. a gate circuit for receiving the latched comparator output and the RAM output signal, wherein the gate circuit forms a gated cue signal; and i. a logic circuit adapted to receive one of the buffered control signals, the gated cue signal, wherein the logic circuit outputs a delayed cue signal to the printing system.

2. The cue delay circuit of claim 1, further comprising an oscillator in communication with the state machine, the counter, the at least one flip flop, and the logic circuit.

3. The cue delay circuit of claim 1, wherein the flip flop comprises a synchronous D flip flop comprising a chip enabler and a reset.

4. The cue delay circuit of claim 1, further comprising a cue pulse conditioning circuit, wherein the cue pulse conditioning circuit is adapted to modify the cue signal by latching the cue signal and synchronizing the transmission of the cue signal with a buffered control signal.

5. The cue delay circuit of claim 4, wherein the cue pulse conditioning circuit further comprises a plurality of gates and flip flops.

6. A method for reading a cue delay after the cue delay has been written for an ink jet printing system comprising the steps of:

j. inputting a start pulse to a state machine, wherein the start pulse initializes the state machine by clearing a counter to set a read address to zero, clearing a flip flop to set a latch comparator output to zero, and clearing a logic circuit to set the cue delay signal to zero;

k. concurrently inputting a cue delay value and the read address to an adder, wherein the adder generates a write address;

l. inputting a first buffered control signal from the state machine to the counter, wherein the counter increments the read address by one;

m. inputting the read address to a comparator and a multiplexer;

n. simultaneously with the step of inputting the cue delay value to the adder, inputting the cue delay value to the comparator to set the comparator output to a logic high value if the read address is greater than the cue delay value;

o. using a second buffered control signal to cause the multiplexer to provide the write address to a read access memory (RAM), wherein the multiplexer output is equal to the write address;

p. latching the comparator output using a gate circuit;

q. inputting a tachometer input to the state machine;

r. simultaneously inputting a cue signal to a RAM and inputting a third buffered control signal to the RAM causing the cue signal to be written to the RAM, wherein the cue signal corresponds to the write address;

s. using the second buffered control signal to cause the multiplexer to form a multiplexer output equal to the read address;

t. outputting the RAM output to the gate circuit;

u. passing the gated cue signal to a logic circuit if the latched comparator output is set to logic high;

v. using a fourth buffered control signal to enable the logic circuit to latch the gated cue signal to form the delayed cue signal;

w. transmitting the delayed cue signal to the ink jet printing system; and x. repeating steps (b) through (n) until a new start pulse is received by the state machine.

7. The method of claim 6, wherein at least one of the buffered control signals are pulsed.

8. The method of claim 6, further comprising the step of employing a cue pulse conditioner to latch the cue signal until the cue signal can be written to the RAM.

9. The method of claim 8, further comprising the step of using the start pulse to initialize the cue pulse conditioning circuit.

* * * * *